US012113868B2

United States Patent
Wang et al.

(10) Patent No.: US 12,113,868 B2
(45) Date of Patent: Oct. 8, 2024

(54) ACCESSING SERVICE OF INTERNET OF THINGS

(71) Applicant: Intel Corporation, Santa Clara, CA (US)

(72) Inventors: Edward Wang, Seattle, WA (US); Richard Chow, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/686,848

(22) Filed: Mar. 4, 2022

(65) Prior Publication Data
US 2022/0368772 A1    Nov. 17, 2022

Related U.S. Application Data

(60) Division of application No. 16/889,098, filed on Jun. 1, 2020, now Pat. No. 11,272,016, which is a
(Continued)

(51) Int. Cl.
H04L 29/08    (2006.01)
H04L 67/125    (2022.01)
(Continued)

(52) U.S. Cl.
CPC .......... *H04L 67/51* (2022.05); *H04L 67/125* (2013.01); *H04W 8/005* (2013.01); *H04W 48/10* (2013.01); *H04W 48/16* (2013.01); *H04W 4/70* (2018.02)

(58) Field of Classification Search
CPC ...... H04L 67/51; H04L 67/125; H04W 8/005; H04W 48/10; H04W 48/16; H04W 4/70
See application file for complete search history.

(56) References Cited

U.S. PATENT DOCUMENTS 6,843,415 B2 * 1/2005 Vogler .................. G06Q 10/08
                                                 235/383
9,916,839 B1    3/2018 Scalise et al.
(Continued)

FOREIGN PATENT DOCUMENTS

EP    2787447    10/2014
WO    2014131001    8/2014

OTHER PUBLICATIONS

Edward Wang et al., "Private.iot—Iot Privacy Notice using Object Name Services," Program of the 4th International Conference of the Internet of Things, http://www.iot-conference.org/iot2014/wp-content/uploads/2014/09/IoT2014Program.pdf, Oct. 8, 2014, Cambridge, MA, 21 pages.
(Continued)

*Primary Examiner* — Schquita D Goodwin
(74) *Attorney, Agent, or Firm* — Hanley, Flight & Zimmerman, LLC

(57) ABSTRACT

Methods, systems, and storage media for accessing one or more services provided by one or more detected Internet of Things ("IoT") devices are described. In embodiments, a mobile device may detect a plurality of IoT devices, obtain an identifier for each of the plurality of IoT devices based on the detection, and obtain an indicator for each of the plurality of IoT devices based at least in part on a corresponding one of the obtained identifiers, wherein each indicator may indicate a service type of a corresponding one of the plurality of IoT devices. The mobile device may generate a notification that indicates a plurality of services available to the mobile device based on each of the obtained indicators. The mobile device may access a service of the plurality of services, wherein the access may include utilization of a set of the plurality of IoT devices required to
(Continued)

provide the service. Other embodiments may be described and/or claimed.

32 Claims, 4 Drawing Sheets

Related U.S. Application Data continuation of application No. 14/668,051, filed on Mar. 25, 2015, now Pat. No. 10,673,959.

(51) Int. Cl.
| | |
|---|---|
| *H04L 67/51* | (2022.01) |
| *H04W 8/00* | (2009.01) |
| *H04W 48/10* | (2009.01) |
| *H04W 48/16* | (2009.01) |
| *H04W 4/70* | (2018.01) |

(56) References Cited

U.S. PATENT DOCUMENTS

| | | | |
|---|---|---|---|
| 9,933,768 | B2 | 4/2018 | Britt et al. |
| 10,673,959 | B2 * | 6/2020 | Wang ............... H04L 67/125 |
| 11,272,016 | B2 * | 3/2022 | Wang ................ H04L 67/51 |
| 2008/0154656 | A1* | 6/2008 | Kail ................ G06F 16/93 |
| | | | 707/E17.096 |
| 2013/0042244 | A1* | 2/2013 | Li .................... H04W 4/70 |
| | | | 718/100 |
| 2014/0059695 | A1* | 2/2014 | Parecki ............. H04W 12/08 |
| | | | 726/26 |
| 2014/0073252 | A1 | 3/2014 | Lee et al. |
| 2014/0108943 | A1* | 4/2014 | Lee .................... H04W 4/80 |
| | | | 715/738 |
| 2014/0244001 | A1 | 8/2014 | Glickfield et al. |
| 2014/0244710 | A1* | 8/2014 | Sharma .............. H04L 67/63 |
| | | | 709/201 |
| 2014/0280723 | A1 | 9/2014 | Gokul |
| 2014/0331144 | A1 | 11/2014 | Kim et al. |
| 2015/0006695 | A1 | 1/2015 | Gupta |
| 2015/0019714 | A1 | 1/2015 | Shaashua et al. |
| 2015/0058445 | A1 | 2/2015 | Choi et al. |
| 2015/0113172 | A1 | 4/2015 | Johnson et al. |
| 2015/0118996 | A1* | 4/2015 | Shaw ................ H04W 12/08 |
| | | | 455/411 |
| 2015/0195365 | A1* | 7/2015 | Choi ................. H04W 4/70 |
| | | | 715/739 |
| 2015/0201022 | A1* | 7/2015 | Kim ................. H04W 12/068 |
| | | | 709/203 |
| 2015/0237071 | A1* | 8/2015 | Maher ............... H04W 12/04 |
| | | | 726/1 |
| 2015/0347114 | A1 | 12/2015 | Yoon |
| 2015/0381543 | A1* | 12/2015 | Hong ............... G06Q 30/02 |
| | | | 709/203 |
| 2016/0011910 | A1 | 1/2016 | Kang |
| 2016/0036764 | A1* | 2/2016 | Dong ................ H04L 45/22 |
| | | | 370/254 |
| 2016/0088049 | A1 | 3/2016 | Seed et al. |
| 2016/0105501 | A1* | 4/2016 | Choi ................ H04L 67/02 |
| | | | 709/225 |
| 2016/0119434 | A1* | 4/2016 | Dong ................ H04L 67/63 |
| | | | 709/220 |
| 2016/0135241 | A1* | 5/2016 | Gujral ............... H04W 76/14 |
| | | | 370/328 |
| 2016/0182446 | A1 | 6/2016 | Kong et al. |
| 2016/0209899 | A1 | 7/2016 | Brantner et al. |
| 2016/0226674 | A1 | 8/2016 | Kangshang et al. |
| 2016/0242043 | A1* | 8/2016 | Dong ................ H04W 24/10 |
| 2017/0072329 | A1 | 3/2017 | Akavia et al. |

OTHER PUBLICATIONS

European Patent Office, "Extended European Search Report," issued Aug. 17, 2016 in connection with European Patent Application No. 16153890.5, 11 pages.

GS1 Object Name Service (ONS) Version 2.0.1, Ratified Standard, Issue 2, Jan. 31, 2013, 34 pages.

European Patent Office, "Office Action," dated Jul. 6, 2017 in connection with European Patent Application No. 16153890.5, 13 pages.

United States Patent and Trademark Office, "Non-Final Office Action," issued May 5, 2017 in connection with U.S. Appl. No. 14/668,051, 17 pages.

United States Patent and Trademark Office, "Final Office Action," issued Nov. 30, 2017 in connection with U.S. Appl. No. 14/668,051, 20 pages.

United States Patent and Trademark Office, "Non-Final Office Action," issued Jan. 2, 2019 in connection with U.S. Appl. No. 14/668,051, 29 pages.

United States Patent and Trademark Office, "Final Office Action," issued Jul. 30, 2019 in connection with U.S. Appl. No. 14/668,051, 23 pages.

Kindborg, "Quick Guide to Making a Mobile App for the TI SensorTag using JavaScript," 2014, 10 pages.

United States Patent and Trademark Office, "Notice of Allowance and Fee(s) Due," issued Feb. 5, 2020 in connection with U.S. Appl. No. 14/668,051, 9 pages.

United States Patent and Trademark Office, "Restriction Requirement," issued Aug. 11, 2021 in connection with U.S. Appl. No. 16/889,098, 7 pages.

United States Patent and Trademark Office, "Notice of Allowance and Fee(s) Due," issued Nov. 10, 2021 in connection with U.S. Appl. No. 16/889,098, 19 pages.

European Patent Office, "Office Action," dated Nov. 28, 2017 in connection with European Patent Application No. 16153890.5, 10 pages.

European Patent Office, "Summons to Attend Oral Proceedings Pursuant to Rule 115(1) EPC," dated Sep. 3, 2018 in connection with European Patent Application No. 16153890.5, 17 pages.

European Patent Office, "Brief Communication," dated Jan. 29, 2019 in connection with European Patent Application No. 16153890. 5, 5 pages.

European Patent Office, "Intention to Grant," dated Mar. 21, 2019 in connection with European Patent Application No. 16153890.5, 45 pages.

European Patent Office, "Decision to Grant," dated Mar. 21, 2019 in connection with European Patent Application No. 16153890.5, 2 pages.

\* cited by examiner

ACCESSING SERVICE OF INTERNET OF THINGS

RELATED APPLICATIONS

The present application is a continuation application or divisional application of U.S. application Ser. No. 16/889,098 filed on Jun. 1, 2020, which is a continuation application of U.S. application Ser. No. 14/668,051 filed on Mar. 25, 2015 issued as U.S. Pat. No. 10,673,959 on Jun. 2, 2020, the contents of each of which are hereby incorporated by reference in their entireties.

FIELD

The present disclosure relates to the field of Internet of Things ("IoT"), and in particular, to apparatuses, methods and storage media associated with discovering and utilizing services provided by IoT devices.

BACKGROUND

The Internet of Things ("IoT") is a network of objects or "things", each of which is embedded with hardware and/or software that enable connectivity to the network. An object, device, sensor, or "thing" (also referred to as an "IoT device") that is connected to a network typically provides information to a manufacturer, operator, and/or other connected devices in order to track usage of the object and/or obtain services. IoT devices are deployed in homes, offices, manufacturing facilities, the natural environment, and inside biotic organisms.

Device manufacturers and/or service providers are developing and deploying IoT devices at an increasing rate in order to fulfill an increasing demand to track data and/or obtain services using one or more IoT devices. As manufacturers and/or service providers develop and deploy various IoT devices, interoperability between different IoT devices also increases because many IoT devices require a proprietary interface and/or a proprietary application in order for users to access the functionality and/or services provided by the different IoT devices.

Furthermore, due to the widespread use of IoT devices, users may come into contact with one or more IoT devices without realizing that they have in fact come into contact with the one or more IoT devices. Therefore, many users are unable to utilize the services provided by the IoT devices they encounter. In order to utilize the services provided by IoT devices, a user usually has to be aware of the existence of the IoT devices surrounding the user. In addition to requiring prior knowledge of IoT devices, because competing interfaces and/or applications may be required to access IoT devices, it may be difficult for many users to utilize services that require multiple IoT devices developed by different manufacturers and/or deployed by difference service providers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
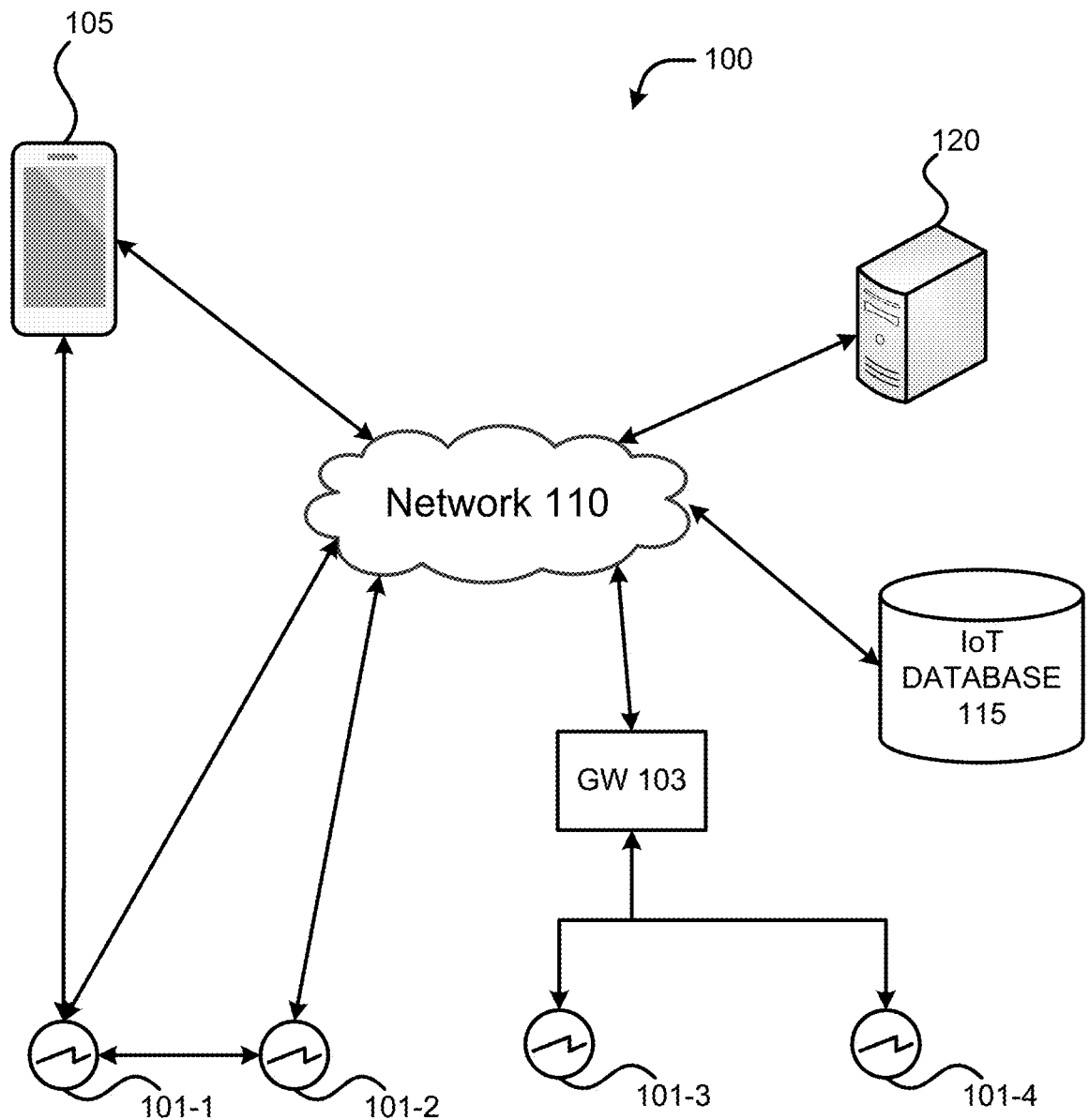
FIG. 1 illustrates a communications network in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural and/or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions and/or operations in turn, in a manner that is most helpful in understanding the claimed subject matter. However, the order of description should not be construed to imply that the various operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For the purposes of the present disclosure, the phrase "at least one of A and B" means (A), (B), or (A and B).

The description may use the phrases "in an embodiment", or "in embodiments", which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "mobile device" may be considered synonymous to, and may hereafter be occasionally referred to, as a client, mobile, mobile unit, mobile terminal, mobile station, mobile user, user equipment (UE), user terminal, subscriber, user, remote station, access agent, user agent, receiver, etc., and may describe a remote user of network resources in a communications network. Furthermore, the term "mobile device" may include any type of wireless device such as consumer electronics devices, smart phones, tablet personal computers, wearable computing devices, personal digital assistants (PDAs), laptop computers, and/or any other like physical computing device that is able to connect to a communications network.

As used herein, the term "network element", may be considered synonymous to and/or referred to as a networked computer, networking hardware, network equipment, router, switch, hub, bridge, gateway, and/or other like device. The term "network element" may describe a physical computing device of a wired or wireless communication network that is configured to host a client device and the like. Furthermore, the term "network element" may describe equipment that provides radio baseband functions for data and/or voice connectivity between a network and one or more users.

Example embodiments disclosed herein provide systems and methods for determining whether one or more "Internet of Things" (IoT) devices are proximate to and/or in a region surrounding a mobile device; determining one or more services provided by the IoT devices surrounding the mobile device; and enabling the mobile device to access the one or more services provided by the IoT devices. It should be noted that objects, sensors, or other like devices that are part of the IoT may be referred to as "IoT devices", "smart objects", "smart devices", and the like. The IoT is a network of objects that are embedded with hardware and software components that enable the objects to communicate over a communications network (e.g., the Internet). Because the IoT devices are enabled to communicate over a network, the IoT devices may exchange event-based data with service providers in order to enhance or complement the services provided by the service providers.

These IoT devices are typically able to transmit data autonomously or with little to no user intervention. Because the IoT devices require little to no user intervention to operate, users may not be aware of the IoT devices they come into contact with in a given environment. Thus, the users of mobile devices are typically unable to control or otherwise access the services provided by the IoT devices that the user may encounter. Accordingly, example embodiments provide methods and systems for discovering the services provided by IoT devices surrounding a mobile device and allowing the mobile device to access desired service provided by the IoT devices surrounding the mobile device.

It should be recognized that, in various embodiments, the services provided by IoT devices may include capturing various types of data and/or controlling one or more physical devices. As such, the example embodiments provided herein allow a mobile device to access the captured data and/or control the one or more physical devices. Additionally, it should be noted that a service may utilize multiple IoT devices. Accordingly, when a user of a mobile device selects a service, multiple IoT devices may be physically altered in order to provide the service. For example, a "temperature control" service may include controlling a thermostat, opening/closing windows, opening/closing air duct vents, changing level of blinds based on the time of day, etc. Furthermore, a single IoT device may be used by multiple services. For example, an IoT device that opens/closes a window may be used for both a temperature control service and a home security service. Thus, the services may utilize multiple IoT devices that are provided by different vendors/manufacturers/service providers. Furthermore, each IoT device may be utilized by multiple services that are provided by different service providers.

Referring now to the figures. FIG. 1 shows a communications network 100 in accordance with various embodiments. As shown in FIG. 1, communications network 100 may include IoT devices 101-1 to 101-4 (collectively referred to as "IoT devices 101"), gateway (GW) 103, mobile device 105, network 110, IoT database 115, and application server 120.

IoT devices 101 may be any object, device, sensor, or "thing" that is embedded with hardware and/or software components that enable the object, device, sensor, or "thing" to communicate with another device (e.g., mobile device 105, application server 120, another IoT device 101, etc.) over a network (e.g., network 110) with little or no user intervention. In this regard, IoT devices 101 may include a transmitter/receiver (or alternatively, a transceiver), one or more memory devices, and/or one or more processors. Furthermore, IoT devices 101 may be embedded with or otherwise include a transmitter or other like device that broadcasts an identification signal. In various embodiments, the identification signal may be a radio-based signal, such as a Wi-Fi signal, Bluetooth Low Energy (BLE) signal, an active radio-frequency identification (RFID) signal, an infrared signal, and the like. According to various embodiments, the identification signal may comprise one or more data packets or data frames, where the data packets or data frames include a unique identifier associated with the IoT device 101 transmitting the identification signal. In various embodiments, the unique identifier (or alternatively, "identifier" or "identification information") may include a universally unique identifier (UUID), an electronic product code (EPC), a media access control address (MAC address), an Internet Protocol (IP) address, an Apache QPID address, and/or any other like identification information.

IoT devices 101 may be any type of sensor, meter, or other like device that can capture and/or record data associated with an event. For instance, in various embodiments, IoT devices 101 may be biotic sensors and/or devices, such as monitoring implants, biosensors, biochips, and the like. Additionally, IoT devices 101 may be abiotic sensors and/or devices, such as autonomous sensors and/or meters, Machine Type Communications (MTC) devices, machine to machine (M2M) devices, and the like. An event may be any occurrence of an action, such as a temperature change, an electrical output, a change in water usage, an inventory level/amount change, a heart rate, a glucose level, a state/position/orientation change of a device, and the like. In various embodiments, an event may be detected by one or more IoT devices based on sensor outputs, timer values, user actions, messages from a computing device, and the like. Once data associated with an event is captured and recorded by an IoT device 101, the captured data may be relayed through the network 110 and reported to a service provider (e.g., an operator of the application server 120), a mobile device 105, and/or another one of the IoT devices 101. The service provider, a user of the mobile device or the mobile device itself, and/or IoT device may take an appropriate action based on a notification of the event to (e.g., reduce or increase temperature, restock inventory items, reduce/increase an activity level, reduce/increase sugar intake, and the like). In various embodiments, an IoT device 101 may connect with or otherwise communicate with the mobile device 105 via a direct wireless connection. In such embodiments, the data associated with an event may be reported to the mobile device 105 without being relayed through the network 110. It should be noted that the IoT devices 101 may be configured to report data on a period or cyclical basis, or based on a desired event that is captured and recorded by an IoT device 101.

In various embodiments, the IoT devices 101 may include one or more electro-mechanical components which allow the IoT device 101 to change its state, position, and/or orientation. These electro-mechanical components may include one or more motors, actuators, wheels, thrusters, propellers, claws, clamps, hooks, and/or other like electro-mechanical components. In such embodiments, the IoT devices 101 may be configured to change its state, position, and/or orientation based on one or more captured events and/or instructions or control signals received from a service provider (e.g., an operator of the application server 120) and/or mobile device 105. In various embodiments, an operator may receive, from one or more IoT devices 101, data associated with a captured event and physically control the IoT device 101 by transmitting instructions or other like control signals to the IoT device 101. For example, in embodiments where an IoT device 101 is a security camera, the security camera may change its position and/or orientation based on instructions from a human operator and/or based on a moving object detected by the security camera. By way of another example, in embodiments where an IoT device 101 is an actuator that opens/closes a window, the actuator may change its state (e.g., fully open, fully closed, or partially open/closed) based on instructions from a mobile device. It should be noted that a performance of one or more actions (e.g., the collection/reporting of data, altering a state, position, and/or orientation, etc.) by one or more IoT devices 101 may be referred to as a "service". The IoT devices 101 may be grouped according to functions that they may perform, where one or more of the functions are associated with one or more services.

GW 103 may be a network element configured to provide communication services to IoT devices (e.g., IoT devices 101) and/or mobile devices (e.g., mobile device 105) operating within a computer network (e.g., an enterprise private network, virtual private network, local area network (LAN), a virtual local area network (VLAN), and/or any other like computer network). The GW 103 may be a wired or wireless access point, a router, a switch, a hub, and/or any other like network device that allows computing devices to connect to a network.

The GW 103 may include one or more processors, a network interface, one or more transmitters/receivers connected to one or more antennas, and a computer readable medium. The one or more transmitters/receivers may be configured to transmit/receive data signals to/from one or more IoT devices 101 and/or mobile device 105. The GW 103 may process and/or route data packets according to one or more communications protocols, such as Ethernet, Point-to-Point Protocol (PPP), High Level Data Link Control (HDLC), Internet Protocol version 4 (IPv4), Internet Protocol version 6 (IPv6), and/or any other like protocols. The GW 103 may employ one or more network interfaces in order to allow IoT devices 101 and/or mobile device 105 to connect to network 110, such as Ethernet, Fibre Channel, G.hn or ITU-T, 802.11 or Wi-Fi, Bluetooth, and/or any other like network connection interfaces.

According to various embodiments, the GW 103 may act as a central hub for one or more IoT devices 101 (e.g., IoT device 101-3 and IoT device 101-4 as shown in FIG. 1). In such embodiments, GW 103 may be a part of a private IoT network that is operated by a single service provider, IoT device manufacturer, and/or any other like entity. In embodiments where GW 103 is a hub for IoT devices 101 that are included in a private IoT network, GW 103 may connect the IoT devices 101 in the private IoT network to the network 110 and/or mobile device 105. As shown in FIG. 1, GW 105 is connected to IoT devices 101-3 and 101-4, and thus, GW 103 may enable IoT devices 101-3 and 101-4 to provide services to mobile device 105 via network 110. However, in various embodiments mobile device 105 may directly connect with GW 103, such that GW 103 may enable IoT devices 101-3 and 101-4 to provide services to mobile device 105 via the direct connection.

Mobile device 105 may be a physical hardware device that is capable of running one or more applications. Mobile device 105 may include a transmitter/receiver (or alternatively, a transceiver), memory, one or more processors, and/or other like components. Mobile device 105 may be configured to send/receive data to/from a network element (e.g., IoT database 115, application server 120, etc.) via a network (e.g., network 110). Mobile device 105 may be designed to sequentially and automatically carry out a sequence of arithmetic or logical operations; equipped to record/store digital data on a machine readable medium; and transmit and receive digital data via network 110. Mobile device 105 may be a wireless cellular phone, a smartphone, a laptop personal computer (PCs), a tablet PC, a wearable computing device, a handheld messaging device, a personal data assistant, an electronic book reader, an augmented reality head-mounted (or helmet-mounted) display device, and/or any other physical or logical device capable of recording, storing, and/or transferring digital data via a network element. Mobile device 105 may communicate over the network 110 in accordance with one or more wireless communications protocols and/or one or more cellular phone communications protocols. For example, mobile device 105 may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, Long Term Evolution (LTE), and/or any other "wireless" communication protocols, including RF-based, optical, and so forth.

Mobile device 105 may be equipped with location (or alternatively "geolocation"), positioning, and/or navigation circuitry, such as a Global Positioning System ("GPS") receiver, as well as software to convert received GPS signals into a location and/or position (within some margin of error). In various embodiments, alternate positioning systems may be employed, such as wireless network signal-strength-based indoor positioning system (IPS), hybrid systems combining global and local positioning systems, and/or other like positioning and/or location detection systems. However, in various embodiments, geolocation and/or positioning information may come from other sources including an IP address, Wi-Fi and/or Bluetooth MAC address, radio-frequency identification ("RFID"), Wi-Fi connection location, GSM/CDMA cell IDs, and the like. Mobile device 105 may include an accelerometer, gyroscope, gravimeter, and/or another like device that is configured to measure and/or detect a motion, an acceleration, and/or an orientation of the mobile device 105. In such embodiments, the mobile device 105 may be configured to determine a magnitude and direction of an acceleration and/or motion of the mobile device 105, and convert the acceleration and/or motion of the mobile device 105 into position and/or orientation information.

Mobile device 105 may be configured to run, execute, or otherwise operate one or more applications. The applications may include native applications, web applications, and hybrid applications. The native applications may be used for operating the mobile device 105, such as using a camera or other like image sensor of the mobile device 105, GPS functionality of the mobile device 105, an accelerometer of the mobile device 105, cellular phone functionality of the mobile device 105, and other like functions of the mobile device 105. Native applications may be platform or operating system (OS) specific. Native applications may be developed for a specific platform using platform-specific development tools, programming languages, and the like. Such platform-specific development tools and/or programming languages may be provided by a platform vendor. Native applications may be pre-installed on mobile device 105 during manufacturing, or provided to the mobile device 105 by an application server (e.g., application server 120) via a network (e.g. network 110). Web applications are applications that load into a web browser of the mobile device 105. The web applications may be websites that are designed or customized to run on a mobile device by taking into account various mobile device parameters, such as resource availability, display size, touchscreen input, and the like. In this way, web applications may provide an experience that is similar to a native application within a web browser. Web applications may be any server-side application that is developed with any server-side development tools and/or programming languages, such as PHP, Node.js, ASP.NET, and/or any other like technology that renders HTML. Hybrid applications may be a hybrid between native applications and web applications. Hybrid applications may be a stand-alone, skeletons, or other like application containers that may load a website within the application container. Hybrid applications may be written using website development tools and/or programming languages, such as HTML5, CSS, JavaScript, and the like. Hybrid applications use browser engine of the mobile device 105, without using a web browser of the mobile device 105, to render a website's services locally. Hybrid applications may also access mobile device capabilities that are not accessible in web applications, such as the accelerometer, camera, local storage, and the like.

In various embodiments, mobile device 105 may be configured to detect and capture one or more signals being broadcast by a smart object (e.g., IoT devices 101) and/or a network element (e.g., a GW 103, etc.). For example, mobile device 105 may be configured to perform BLE proximity sensing. In such embodiments, the mobile device 105 may scan a region or area surrounding the mobile device 105 to detect an IoT device 101 broadcasting and/or transmitting a Bluetooth low energy signal that includes a unique identifier. By way of another example, the mobile device 105 may scan for IoT devices 101 tagged or otherwise embedded with a RFID device (also referred to as a "RFID tag"). In such embodiments, the mobile device 105 may scan a region or area surrounding the mobile device 105 to detect RFID tagged IoT devices 101, which broadcast and/or transmit RF signals that include identification information. By way of yet another example, the mobile device 105 may be configured to obtain a signal from a network element, such as a router or other like device acting as a central hub for a network of IoT devices 101.

Network 110 may be any network that allows computers to exchange data. Network 110 may include one or more network elements (not shown) capable of physically or logically connecting computers. The network 110 may include any appropriate network, including an intranet, the Internet, a cellular network, a local area network (LAN), a personal network or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

IoT database 115 may be a hardware device or system for storing IoT information for a plurality of IoT devices. IoT database 115 may include one or more relational database management systems (RDBMS) one or more object database management systems (ODBMS), a column-oriented DBMS, correlation database DBMS, and the like. According to various example embodiments, the IoT database 115 may be stored on or otherwise associated with one or more data storage devices. These data storage devices may include at least one of a primary storage device, a secondary storage device, a tertiary storage device, a non-linear storage device, and/or other like data storage devices. In some embodiments, IoT database 115 may be associated with one or more network elements that enable one or more clients (e.g., mobile device 105) to query the IoT database 115 and/or store IoT device information in the IoT database 115. Furthermore, IoT database 115 may include one or more virtual machines, such that the physical data storage devices containing the IoT database 115 may be logically divided into multiple virtual data storage devices and/or databases. Alternatively, the IoT database 115 may reside on one physical hardware data storage device. In various example embodiments, the IoT database 115 may be the Object Naming Service (ONS), which provides product descriptions (i.e., indicators) for IoT devices that are embedded with RFID tags. The ONS may be a system of network elements that may include one or more systems and/or applications for discovering information about an IoT device and related services using identification information. In embodiments, ONS may be the system currently operated by the GS1's EPCglobal Network in conjunction with the Massachusetts Institute of Technology's Auto-ID Labs. For these embodiments, IoT database 115 may provide descriptions or indicators of IoT devices in response to receiving a query that includes an Electronic Product Code (EPC). The ONS may use the Domain Name System (DNS) in order to obtain indicators using an EPC identifier, where the EPC may provide similar functionality as a Uniform Resource Identifier (URI). For example, when an RFID tag signal is obtained by the mobile device 105, the EPC contained in the RFID tag signal may be passed through the one or more modules included in the mobile device 105 (as described with regard to FIGS. 2-3), which may then be used by the mobile device 105 to query the ONS to find an indicator associated with the EPC extracted from the RFID tag signal. In response to the query, the ONS may determine a location (i.e., a database associated with an EPC Information Service) where the indicator may be stored and point the mobile device 105 to the location where the indicator is stored. The mobile device 105 may obtain the indicator from the specified location, and the description of the properties of the IoT device 101 may be rendered in a browser of the mobile device 105 and/or forwarded to a service provider. Currently, the indicator returned by the ONS has Physical Markup Language (PML) format, which describes IoT device information, such as a product name, product description, a creation/manufacturing date, an expiration date, the product's current location and/or position, the product's current temperature, etc. According to various example embodiments where the IoT database 115 is the ONS, a services category may be added to the existing PML for each IoT device within the ONS directory. In various embodiments, the services category may describe a service name and/or type, a service provider, a service description, privacy information, and/or any other like description of a service provided by an IoT device. Instead of altering the existing structure of the ONS to include the services category, in various embodiments, the IoT database 115 may store service information in association with an IoT device's identifier, where the existing IoT device information and environment information is returned from the ONS and the service information may be returned from the IoT database 115. In some embodiments, the IoT database 115 may include one or more systems and/or applications for storing all relevant information about IoT devices 101 (e.g., identifiers, indicators, etc.) and providing the relevant information to mobile device 105 in response to a database query.

As noted previously, many different IoT device manufacturers and/or service providers may develop and deploy IoT devices 101 that require proprietary interfaces and/or applications to access the IoT devices, and the proprietary interfaces and/or applications are not compatible with one another. According to various embodiments, the various modules included in the mobile device 105 (as described with regard to FIGS. 2-3) may obtain identifiers that are in different formats, convert the identifiers into a desired format (e.g., into an EPC), and use the converted identifier to obtain the service information from the IoT database 115 as described previously.

Application server 120 may be a hardware computing device that may include one or more systems and/or applications for providing one or more services. Application server 120 may include a processor, memory or computer readable storage medium, and a network interface. Additionally, application server 120 may be a single physical hardware device, or application server 120 may be physically or logically connected with other network devices, such that the application server 120 may reside on one or more physical hardware devices. Furthermore, application server 120 may be connected to, or otherwise associated with one or more data storage devices (not shown). The application server 120 may be any device capable of receiving and responding to requests from one or more client devices (e.g., mobile device 105) across a computer network (e.g., network 110) to provide one or more services. The application server 120 may provide IoT device control services, and may be able to generate content such as text, graphics, audio and/or video to be transferred to a viewer, which may be served to the viewer by a Web server (not shown) in the form of HTML, XML, and/or any other appropriate structured language. The handling of all requests and responses, (e.g., requests for item information and the information provided in response) as well as the delivery of content between the mobile device 105 and/or the IoT devices 101 and the application server 120 may be handled by the Web server (not shown). Furthermore, it should be understood that the application server 120 may not be required and the applications and software components discussed herein may be executed on any appropriate device or host machine. The application server 120 may include an operating system that may provide executable program instructions for the general administration and operation of application server 120, and may include a computer-readable medium storing instructions that, when executed by a processor of the application server 120, may allow the application server 120 to perform its intended functions. Suitable implementations for the operating system and general functionality of the servers are known or commercially available, and are readily implemented by persons having ordinary skill in the art, particularly in light of the disclosure herein.

In various embodiments, the application server 120 may be associated with a service provider (hereinafter referred to as "service provider 120"). Service provider 120 may be an entity that provides computer based services to one or more clients. A service may be any operation or collection of operations that perform a function. The services may include monitoring and/or analyzing event-based data, and/or accessing and/or controlling one or more IoT devices 101. In accordance with various example embodiments, the service provider 120 may provide the means for users to utilize one or more IoT devices 101. In this regard, the service provider 120 may develop and distribute one or more applications that allow mobile device 105 to access one or more IoT devices 101 that have a same or similar service type. For example, service provider 120 may be a home security service that develops and distributes a mobile application that enable mobile device 105 to control IoT devices 101 having a "home security" service type, such as security cameras and/or other like sensors, door and window locks, a security alarm system, and the like.

It should be noted that in some embodiments, the service provider 120 may develop a mobile application that utilizes IoT devices 101 that are manufactured by a single manufacturer, while in other embodiments the service provider 120 may develop an application that utilizes IoT devices 101 that are manufactured by multiple different manufacturers. In embodiments where the mobile application utilizes IoT devices manufactured by different manufacturers, the mobile application may interact with the various modules of the example embodiments in order to utilize the IoT devices of different manufacturers. In this way, the example embodiments may act as an intermediary between the competing device interfaces and/or applications that may be required to access IoT devices produced by different manufacturers.

As shown in FIG. 1, only four IoT devices 101, one GW 103, one mobile device 105, a single IoT database 115, and a single application server 120 are present. According to various embodiments, any number of IoT devices, any number of gateways, any number of mobile devices, any number of servers, and/or any number of databases (not shown) may be present. Additionally, in some embodiments, application server 120 and/or one or more databases may be virtual machines, and/or they may be provided as part of a cloud computing service. In various embodiments, application server 120 and one or more databases may reside on one physical hardware device, and/or may be otherwise fully integrated with one another. Furthermore, it should be noted that in various example embodiments, instead of obtaining the service information from the IoT database 115, an independent service may be developed to provide the same or similar services as the IoT database 115, which may be used to obtain the service information as described previously. Thus, the depiction of the illustrative communications network 100 in FIG. 1 should be taken as being illustrative in nature, and not limited to the scope of the disclosure.

Figure 2:
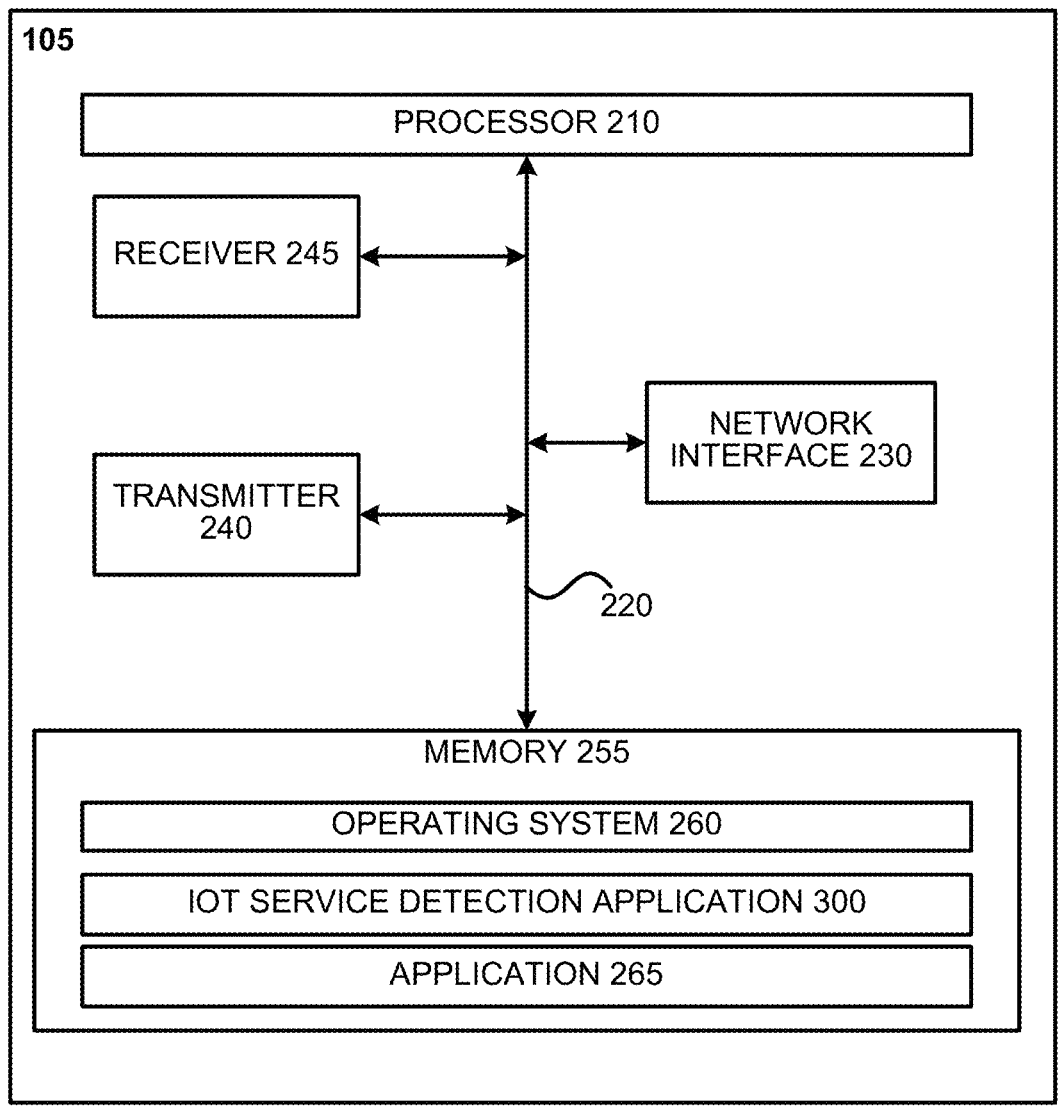
FIG. 2 illustrates the components of a mobile device, in accordance with various example embodiments.

FIG. 2 illustrates the components of the mobile device 105, in accordance with various example embodiments. As shown, mobile device 105 may include processor 210, bus 220, network interface 230, transmitter 240, receiver 245, and memory 255. In some embodiments, mobile device 105 may include many more components than those shown in FIG. 2, such as a display device (e.g., a touchscreen), an input device (e.g., a physical keyboard), one or more image sensors, a transmitter/receiver (or alternatively, a transceiver), a mobile video card and/or graphics processing unit (GPU), and other like components. However, it is not necessary that all of these generally conventional components be shown in order to disclose the example embodiments.

Memory 255 may be a hardware device configured to store an operating system 260 and program code for one or more software components, such as IoT service detection application and/or one or more mobile applications, such as application 265. Memory 255 may be a computer readable storage medium that generally includes a random access memory (RAM), read only memory (ROM), a flash memory device, a solid state disk (SSD), a secure digital (SD) card, and/or other like storage media capable of storing and recording data. The program code and/or software components may also be loaded from a separate computer readable storage medium into memory 255 using a drive mechanism (not shown). Such separate computer readable storage medium may include a memory card, memory stick, removable flash drive, sim card, and/or other like computer readable storage medium (not shown). In some embodiments, software components may be loaded into memory 255 via network interface 230, rather than via a computer readable storage medium.

During operation, memory 255 may include operating system 260, IoT service detection application 300, and application 265. Operating system 260 may manage computer hardware and software resources and provide common services for computer programs. Operating system 260 may include one or more drivers, such as a display driver, camera driver, audio drivers, and/or any other like drivers that provide an interface to hardware devices thereby enabling operating system 260, IoT service detection application 300, and application 265 to access hardware functions without needing to know the details of the hardware itself. The operating system 260 may be a general purpose operating system or an operating system specifically written for and tailored to the mobile device 105.

Application 265 may be a collection of software modules and/or program code that enables the mobile device 105 to access or control one or more services provided by one or more IoT devices 101. Application 265 may be a native application, a web application, or a hybrid application. In various embodiments, service provider 120 may develop the application 265 to utilize one or more IoT devices 101 regardless of a manufacturer or service provider who develops or deploys the IoT devices 101. IoT service detection application 300 may be a collection of software modules and/or program code that enables the mobile device 105 to operate according to the various example embodiments as discussed with regard to FIGS. 3-4.

Processor 210 may be configured to carry out instructions of a computer program by performing the basic arithmetical, logical, and input/output operations of the system. The processor 210 may include a single-core processor, a dual-core processor, a triple-core processor, a quad-core processor, etc. The processor 210 may perform a variety of functions for the mobile device 105 and may process data by executing program code, one or more software modules, firmware, middleware, microcode, hardware description languages, and/or any other like set of instructions stored in the memory 255. The program code may be provided to processor 210 by memory 255 via bus 220, one or more drive mechanisms (not shown), and/or via network interface 230. In order to perform the variety of functions and data processing operations, the program code and/or software components may be executed by the processor 210. On execution by the processor 210, the processor 210 may cause mobile device 105 to perform the various operations and functions delineated by the program code.

For example, in various embodiments, the mobile device 105 may include various modules configured to operate (through hardware and/or software) to obtain one or more services provided by one or more IoT devices 101 as described herein. The IoT service detection application 300 may include various modules that may be loaded into the processor 210. The various modules may include a detection module 305, a service identification module 310, a service notification module 325, a service access module 330, a conversion module 315, and a lookup module 320 (as discussed with regard to FIG. 3). Once the various modules of the IoT service detection application 300 are loaded into memory 255 and executed by the processor 210, the processor 210 may be configured to cause mobile device 105 to detect a plurality of IoT devices 101; obtain an identifier for each of the plurality of IoT devices 101 based on the detection; obtain an indicator for each of the plurality of IoT devices 101 based at least in part on a corresponding one of the obtained identifiers; generate a notification that indicates a plurality of services available to the mobile device 105 based on each of the obtained indicators; and enable the mobile device 105 to access a service of the plurality of services by allowing the mobile device 105 to utilize at least a set of the plurality of IoT devices 101 required to provide the service. While specific modules are described herein, it should be recognized that, in various embodiments, various modules may be combined, separated into separate modules, and/or omitted. Additionally, in various embodiments, one or more modules may be implemented on separate devices, in separate locations, or distributed, individually or in sets, across multiple processors, devices, locations, and/or in cloud-computing implementations.

Bus 220 may be configured to enable the communication and data transfer between the components of mobile device 105. Bus 220 may comprise a high-speed serial bus, parallel bus, internal universal serial bus (USB), Front-Side-Bus (FSB), and/or other suitable communication technology for transferring data between components within mobile device 105 and/or between mobile device 105 and other like devices.

Network interface 230 may be a computer hardware component that connects mobile device 105 to a computer network (e.g., network 110). Network interface 230 may connect mobile device 105 to a computer network via a wired or wireless connection. Network interface 230 may operate in conjunction with a wireless transmitter/receiver and/or transceiver (not shown) that is configured to operate in accordance with one or more wireless standards. The network interface 230 may also include one or more virtual network interfaces configured to operate with application 265 and/or other like mobile applications.

Transmitter 240 may be any type of hardware device that generates or otherwise produces radio waves in order to communicate with one or more other devices. The transmitter 240 may be coupled with an antenna (not shown) in order to transmit data to one or more other devices. The transmitter 240 may be configured to receive digital data from one or more components of mobile device 105 via bus 220, and convert the received digital data into an analog signal for transmission over an air interface. Receiver 245 may be any type of hardware device that can receive and convert a signal from a modulated radio wave into usable information, such as digital data. The receiver 245 may be coupled with the antenna (not shown) in order to capture radio waves. The receiver 245 may be configured to send digital data converted from a captured radio wave to one or more other components of mobile device 105 via bus 220. In various embodiments, mobile device 105 may include a transceiver (not shown) instead of transmitter 240 and receiver 245, where the transceiver is a single component configured to provide the functionality of transmitter 240 and receiver 245 as discussed above.

Figure 3:
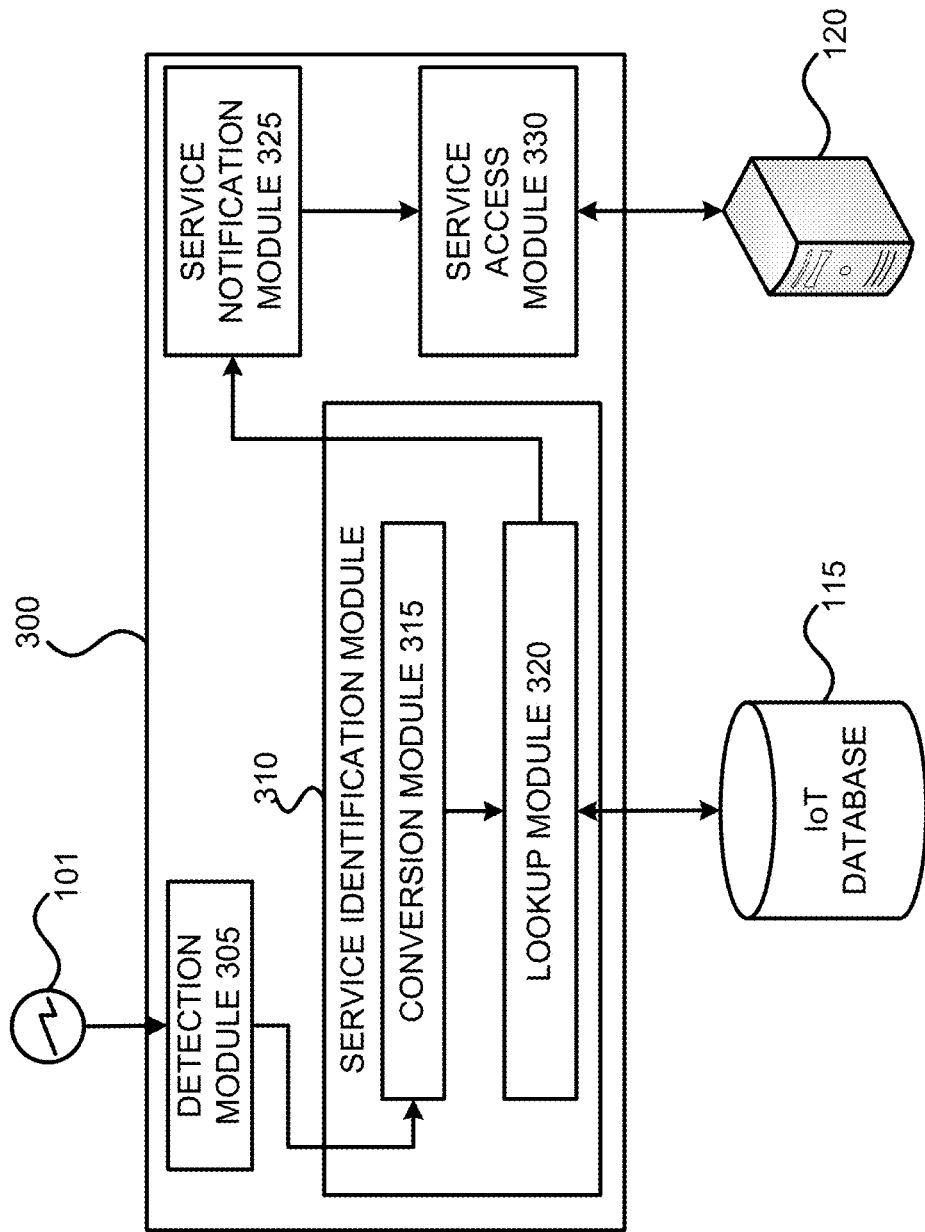
FIG. 3 illustrates example logical components and interaction points of a IoT service detection application, in accordance with various embodiments.

FIG. 3 illustrates example logical components and interaction points of the IoT service detection application 300, in accordance with various embodiments. The IoT service detection application 300 may, in various embodiments, be configured to perform various techniques described herein, including detection of one or more IoT devices 101 and enabling the mobile device 105 to access or control one or more services provided by the one or more IoT device 101. As shown in FIG. 3, IoT service detection application 300 may include detection module 305, service identification module 310, service notification module 325, and service access module 330. The service identification module 310 may include conversion module 315 and a lookup module 320.

According to various embodiments, the detection module 305 may be configured to detect a plurality of IoT devices 101. As discussed previously, each of the IoT devices 101 may broadcast a radio-based signal, such as a Wi-Fi signal, a BLE signal, an active RFID signal, an infrared signal, and the like. Additionally, in various embodiments, the radio-based signal may be broadcast by GW 103 or another like network element acting as a central hub for a network of IoT devices 101. Thus, in various embodiments, the detection module 305 may scan a region that surrounds the mobile device for the signals being broadcast by the IoT devices 101 and/or GW 103. In such embodiments, the detection module 305 may utilize the receiver 245 in order to obtain the broadcasted signals. It should be noted that in many instances, one or more of the IoT devices 101 and/or the GW 103 may be developed and/or deployed by different device manufacturers. Therefore, in various embodiments, the detection module 305 may be configured to obtain all of the signals being broadcast in a given area or region, regardless of the signal type and/or the manufacturer or service provider who developed the IoT device 101 and/or GW 103. In some embodiments, the detection module 305 may be configured to obtain only certain selected types of signals being broadcast in a given area or region, where the selection of signal types is based on one or more user preferences or settings indicating one or more desired service providers or manufacturers that a user of the mobile device 105 wishes to utilize. Methods for scanning for and receiving broadcasted signals are generally well-known, and thus, a further detailed description of these methods is omitted. Once the detection module 305 receives the broadcasted signals, the detection module 305 may provide the received signals to the service identification module 310.

According to various embodiments, the service identification module 310 may be configured to obtain an identifier for each of the plurality of IoT devices 101 from the received signals. In various embodiments, the service identification module 310 may be configured to extract the identifier for each of the plurality of IoT devices from a corresponding one of the plurality of signals in order to obtain the identifier. For example, IoT devices 101 that broadcast a Wi-Fi signal, the service identification module 310 may extract a source MAC address from one or more data packets of the Wi-Fi signal. By way of another example, if an IoT device 101 broadcasts a BLE beacon signal, the service identification module 310 may extract a UUID from one or more data packets of the BLE beacon signal. By way of yet another example, if an IoT device 101 broadcasts an active RFID tag signal, the service identification module 310 may extract an EPC from one or more data packets of the active RFID tag signal. Methods for extracting identification information from data packets are generally well-known, and thus, a further detailed description of these methods is omitted. As shown, the service identification module 310 may include conversion module 315 and lookup module 320. The service identification module 310 may use the conversion module 315 and the lookup module 320 to obtain an indicator for each of the IoT devices 101 based at least in part on a corresponding one of the obtained identifiers.

According to various embodiments, the conversion module 315 may be configured to determine whether a format of each obtained identifier is a desired format, and convert the format of the obtained identifiers into the desired format when the format of the obtained identifiers are determined to not be the desired format. For example, when the IoT database 115 utilizes the ONS, the ONS may be used to obtain Physical Markup Language (PML) files that describe IoT devices 101, if IoT device 101-1 broadcasts a BLE beacon signal, the service identification module 310 may extract a UUID from one or more data packets of the BLE beacon signal. The conversion module 315 may determine that the UUID is not in the EPC format that is required to obtain PML files from the ONS. The conversion module 315 may then convert the UUID into an EPC and provide the converted EPC to the lookup module 320 to query the ONS. Continuing with the aforementioned example, if IoT device 101-2 broadcasts an active RFID tag signal, the service identification module 310 may extract an EPC from one or more data packets of the RFID tag signal. The conversion module 315 may determine that the EPC is the desired format for obtaining PML files from the ONS. The conversion module 315 may then provide the extracted EPC to the lookup module 320 to query the ONS.

In various embodiments, the conversion module 315 may "rearrange" the information contained in an identifier having an undesired format and place the information in an order delineated by the desired format. Continuing with the aforementioned example, if IoT device 101-1 broadcasts a BLE beacon signal, the conversion module 315 may extract identifying information from the data packets included in the BLE beacon signal, such as a manufacturer name, device type, serial number, and the like. The conversion module 315 may then construct an EPC URI using the extracted identifying information.

According to various embodiments, the lookup module 320 may be configured to query a remote database (e.g. IoT database 115) using the obtained identifiers. For example, when the IoT database 115 is a database associated with the ONS, the lookup modules 320 may query the ONS database using a pure identity EPC URI, an EPC tag URI, etc. It should be noted that the example embodiments are not limited to using EPC URIs to query the ONS, and according to various example embodiments, the lookup module 320 may use any type of identifier that can be used to request information from IoT database 115.

In response to the query, the lookup module 320 may receive an indicator from the IoT database 115. According to various embodiments, an indicator may be a file, record, or other like resource for storing information that provides a description of one or more properties of an IoT device 101. For example, in various embodiments, an indicator may be a markup language file, such as PML, Extensible Markup Language (XML), Hypertext Markup Language (HTML), Extensible HTML (XHTML), and the like. However, it should be noted that the example embodiments are not limited thereto, and an indicator may use any type of markup language or computer programing language that can describe one or more properties of an IoT device 101. The properties described by an indicator may be based on the language that is implemented for the indicator. For example, in embodiments where the IoT database 115 is associated with the ONS, the indicators may be in the PML format, and a PML associated with an IoT device 101 may describe the properties of that IoT device 101, such as a device type, location, deployment environment information, dimensions, device manufacturer and/or device owner, device materials, a name and location of a device being monitored, access permissions, etc. In various example embodiments where the ONS is utilized, a services category may be added to the existing PML, for each IoT device 101. In various embodiments, the services category may describe a service name and/or type, a service provider, a service description, privacy information, and/or any other like description of a service provided by an IoT device 101. Once the indicators are received from the IoT database 115, the lookup module 320 may provide the indicators to the service module 325.

According to various embodiments, the service notification module 325 may be configured to generate a notification that indicates a plurality of services available to the mobile device 105 based on each of the obtained indicators. The notification may be any form of communication that lets the mobile device 105 know of one or more services based on one or more IoT devices 101 that are proximate to the mobile device 105. In various embodiments, the notification may include a list of one or more services available to the mobile terminal based on each of the obtained indicators. The service notification module 325 may populate the list using the services described in the services category of each obtained PML file. In various embodiments, the generation of the notification may be initiated based on the mobile device 105 detecting the presence of one or more IoT devices 101 in the vicinity of the mobile device 105.

The list of services may be populated and/or filtered based on one or more user preferences that are set in advance by the mobile device 105. The user preferences may indicate one or more services that a user of the mobile device 105 wishes to access or control. In various embodiments, the service notification module 325 may provide a user of the mobile device 105 with one or more graphical control elements that enable the user to select one or more service types as preferred or favorite service types. In some embodiments, the service notification module 325 may use or discover user preferences from one or more other applications running on the mobile device 105. In some embodiments, the user preferences may be in the form of a privacy policy that indicates desired service types and/or undesired service types. The desired service types may indicate a type of service that the user of the mobile device 105 desires to access or control, and the undesired service types may indicate a type of service that the user of the mobile device 105 considers to be privacy-invasive or otherwise does not wish to access. In such embodiments, the service notification module 325 may filter the list of services according to the privacy policy, such that the services having the desired service type are distinguished from services of the plurality of services having the undesired service type. For example, the undesired service types may be listed in a section of the list of services than the desired service types, each of the listed services may be labeled as desired services or undesired services, the undesired services may be displayed in a different color, font, font size, etc. than the desired services, and the like. In this way, the undesired service types may serve as an alert or other like notification that one or more IoT devices 101 are collecting data the user of the mobile device 105 may consider invasive.

The list of services may also be populated and/or filtered according to contextual information associated with the mobile device 105. The contextual information of the mobile device 105 may include a position of the mobile device 105, an orientation of the mobile device 105, a movement velocity of the mobile device 105, a date and time that the IoT device 101 are detected by the mobile device 105, a date and time that the list of services is generated by the mobile device 105, and/or any other like contextual information associated with the mobile device 105. For example, if the mobile device 105 is traveling past one or more IoT devices 101 at or above a threshold velocity, such as if the user of the mobile terminal 105 is driving past the IoT devices 101 in a car, the list may not be populated with the services associated with the one or more IoT devices 101. However, if the mobile device 105 is traveling past one or more IoT devices 101 below the threshold velocity, such as if the user of the mobile terminal 105 is walking past the IoT devices 101 on foot, the list may be populated with the services associated with the one or more IoT devices 101. The threshold velocity may be determined based on one or more design choices or empirical studies.

Furthermore, in various embodiments the list of services may also be populated and/or filtered based on a distance between a position of the mobile device 105 and a position of each of the services. The position of a service may be based on a distance between the position of the mobile device 105 and a position of each of the IoT devices 101 that are required to provide the service. The distance of the service may be based on a combined distance of each IoT device 101 from the mobile device 105, a greatest distance of an IoT device 101 from the mobile device 105, and the like. Methods for determining a distance between the position of the mobile device 105 and the position of each of the IoT devices 101 may be based on one or more design choices or empirical studies.

Once the list of services is displayed to the user of the mobile device 105, the user may select one or more of the listed services in order to access one or more desired services by controlling the one or more IoT devices 101 required to provide the selected service. In response to the selection of each service, the service notification module 325 may provide the selection to the service access module 330 in order to access the selected service.

According to various embodiments, the service access module 330 may be configured to enable the mobile device 105 to access a service by allowing the mobile device 105 to utilize the IoT devices 101 required to provide the service. As discussed previously, in various embodiments, a service provider 120 may develop an application 265 that allows the mobile device 105 to access or control one or more IoT devices 101 in order to obtain a service. In such embodiments, in response to the selection of the service from the list of services, the service access module 330 may determine whether such the application 265 is stored in a memory associated with the mobile device 105, such as memory 255, a removable memory stick or memory card, a cloud storage system associated with the mobile device 105, and the like. If the service access module 330 determines that the application 265 does reside on a memory associated with the mobile device 105, the service access module 330 may invoke and cause the application 265 to be executed, thereby enabling the mobile device 105 to access the desired service. If the service access module 330 determines that the application 265 does not reside on a memory associated with the mobile device 105, the service access module 330 may obtain the application 265 from the application server 120. Once the application 265 is obtained from the application server 120, the service access module 330 may cause the application 265 to be executed to enable access to the service.

As shown in FIG. 3, the IoT service detection application 300 comprises each of the detection module 305, the service identification module 310, the conversion module 315, the lookup module 320, the service notification module 325, and the service access module 330. However, according to various embodiments, additional modules may be present and/or the aforementioned modules may be combined of divided into other logical components. Additionally, in various embodiments, one or more of the modules shown in FIG. 3 may be provided as part of a cloud computing service such that one or more physical hardware devices may provide the same or similar functionality as the one or more of the modules shown in FIG. 3. For example, the detection module 305 could be implemented by a server, where the mobile device 105 may provide detection data (e.g., Wi-Fi environment data, etc.) to the server so that the server may determine one or more IoT devices 101 that are proximate to the mobile device 105 from the detection data.

Figure 4:
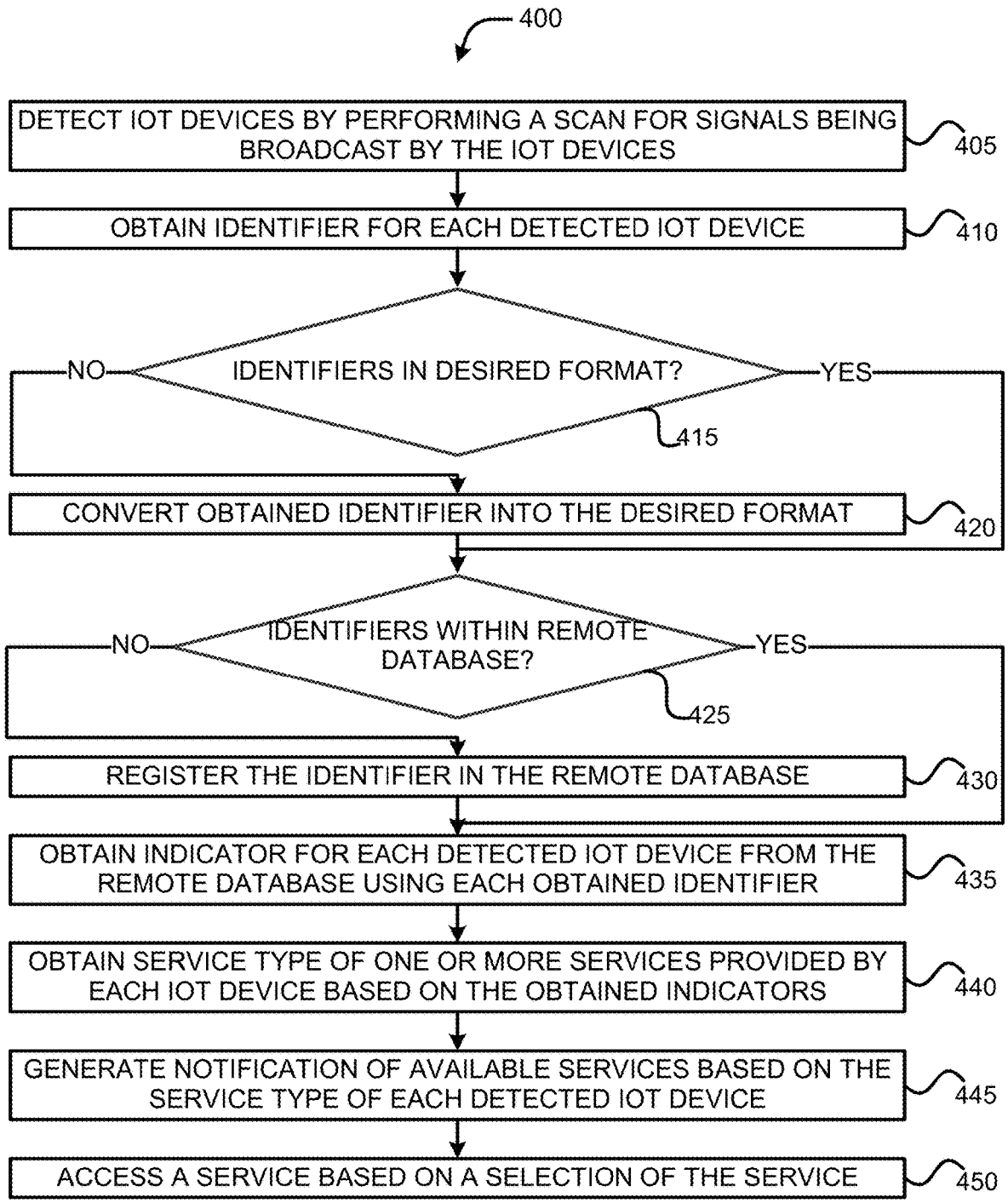
FIG. 4 illustrates an example process 400 of an IoT service detection application, in accordance with various embodiments.

FIG. 4 is a flowchart illustrating an example process 400 of the IoT service detection application 300, in accordance with various embodiments. For illustrative purposes, the operations of process 400 will be described as being performed by the mobile device 105, which is described with respect to FIGS. 1-3. However, it should be noted that other similar devices may operate the process 400 as described below. While particular examples and orders of operations are illustrated in FIG. 4, in various embodiments, these operations may be re-ordered, broken into additional operations, combined, and/or omitted altogether.

Referring to FIG. 4, at operation 405, the mobile device 105 may detect one or more IoT devices 101 by performing a scan for signals being broadcast by the IoT devices 101 in a region surrounding the mobile device 105. As discussed previously, the mobile device 105 may scan for, and obtain the signals being broadcast by the IoT devices 101 according to known methods.

At operation 410, the mobile device 105 may obtain an identifier for each detected IoT device 101. As discussed previously, the signals being broadcast by the IoT devices 101 may comprise a series of data packets, where at least one data packet contains an identifier or other like identification information associated with a corresponding one of the IoT devices 101. The mobile device 105 may extract the identifier from one or more data packets of the broadcasted signal according to known methods.

At operation 415, the mobile device 105 may determine whether the obtained identifiers are in a desired format. If at operation 415, the mobile device 105 may determine that the obtained identifiers are not in the desired format, then the mobile device 105 proceeds to operation 420 to convert the obtained identifiers into the desired format. At operation 420, the mobile device 105 may convert the obtained identifiers into the desired format. According to various embodiments, the desired format may be the EPC format. In such embodiments, the mobile device 105 may determine whether or not an identifier is in the EPC format, and convert the non-EPC identifiers into the EPC format. Referring back to operation 415, if the mobile device 105 determines that the obtained identifiers are in the desired format, then the mobile device 105 may proceed to operation 425 to determine whether the obtained identifier is located within the remote database.

At operation 425, the mobile device 105 may determine whether the obtained identifiers are within a remote database (e.g., IoT database 115) that stores identifiers in association with indicators or other like service information. According to various embodiments, the mobile device 105 may use the obtained identifiers to query the IoT database 115. The determination as to whether the obtained identifiers are located within the IoT database 115 may be based on whether the remote database returns an indicator or not. For example, in embodiments where the IoT database 115 utilizes the ONS, the mobile device 105 may use an EPC URI to query the ONS. If the ONS returns a PML associated with the EPC URI, then the mobile device 105 may determine that the EPC is registered with the ONS. However, if the ONS does not return a PML in response to the EPC URI, then the mobile device 105 may determine that the EPC is not registered with the ONS.

If at operation 425, the mobile device 105 determines that the obtained identifier is not located within the IoT database 115, then the mobile device 105 may proceed to operation 430 to register the identifier in the IoT database 115. Operation 430 may be used when a new IoT device 101 is deployed to a given environment, and the new IoT device 101 needs to be registered to the IoT database 115 using an IoT device identifier. As discussed previously, the data packets included in the signals that are broadcast by the IoT devices 101 may include an identifier or other like identifying information, such as a device name (e.g., serial number), device type, position information, and any information that may be indicative of a service provided by an IoT device 101. In various embodiments, the mobile device 105 may generate an indicator, such as a new PML, using the extracted information. In some embodiments, when the new IoT device 101 is part of a group of proprietary IoT devices, the mobile device 105 may obtain the identifying information from a manufacturer or service provider that deployed the new IoT device 101. In such embodiments, the mobile device 105 may generate the indicator using the identifying information obtained from the manufacturer or service provider. In other embodiments, instead of the mobile device 105 generating the indicator, the mobile device 105 may send a request to the application server 120 requesting that the indicator be generated for the new IoT device 101 by the service provider 120. Once the new indicator is generated, the mobile device 105 may transmit a request to the IoT database 115 to store the generated indicator in association with a new identifier. It should be noted that operations 425 and 430 are optional implementations, and thus, in various embodiments operations 425 and 430 are omitted from the process 400.

Referring back to operation 425, if at operation 425 the mobile device 105 determines that the obtained identifier is located within the remote database, then the mobile device 105 may proceed to operation 435 to obtain an indicator for each detected IoT device 101 from the remote database using each obtained identifier.

At operation 435, the mobile device 105 may obtain an indicator for each detected IoT device 101 from the IoT database 115 using each obtained identifier. As discussed previously, in various embodiments where the IoT database utilizes the ONS, the mobile device 105 may use an EPC URI to query the ONS. In response to the query, the ONS returns a PML associated with the EPC URI. As discussed previously, according to various embodiments, the PML, may be altered to include a services category, which may describe one or more service types associated with an IoT device 101. The service types may indicate one or more services that an IoT device 101 may provide. At operation 440, the mobile device 105 may obtain a service type of one or more services provided by each IoT device 101 from the obtained indicators (e.g., from the altered PML).

At operation 445, the mobile device 105 may generate a notification of the available services based on the service types of each detected IoT device 101. In various embodiments, the notification may be a list of available services, which may include one or more of the service types included in the obtained identifiers. The mobile device 105 may include (or exclude) one or more services in list based on one or more user preferences set by the mobile device 105, contextual information associated with the mobile device 105, a distance between the mobile device 105 and each of the IoT devices 101, and the like. The list of services may include one or more graphical control elements that enable a user of the mobile device 105 to select one of the listed services.

At operation 450, the mobile device 105 may access a service of the available services. As discussed previously, in response to a selection of a desired service from the list of services, the mobile device 105 may obtain and execute an application that is required for obtaining the selected service.

Some non-limiting Examples are provided below.

Example 1 may include a mobile device comprising: at least one processor, a detection module, a service identification module, a service notification module, and a service access module. The detection module may operate on the at least one processor to detect a plurality of IoT devices. The service identification module may operate on the at least one processor to obtain an identifier for each of the plurality of IoT devices based on the detection, and obtain an indicator for each of the plurality of IoT devices based at least in part on a corresponding one of the obtained identifiers. Each indicator may indicate a service type of a corresponding one of the plurality of IoT devices. The service notification module may operate on the at least one processor to generate a notification that indicates a plurality of services available to the mobile device based on each of the obtained indicators. The service access module may operate on the at least one processor to enable the mobile device to access a service of the plurality of services, wherein to access may include utilization of a set of the plurality of IoT devices required to provide the service.

Example 2 may include the mobile device of example 1 wherein the detection module may scan a region that surrounds the mobile device for a plurality of signals, where each of the plurality of signals may have been broadcast by a corresponding one of the plurality of IoT devices and to obtain the plurality of signals, to detect the plurality of IoT devices. The service identification module may extract the identifier for each of the plurality of IoT devices from a corresponding one of the plurality of signals, to obtain the identifier.

Example 3 may include the mobile device of any of the preceding examples wherein the service identification module comprises a conversion module to determine whether a format of each obtained identifier is a desired format, and convert the format of ones of the obtained identifiers into the desired format when the format of the ones of the obtained identifiers are determined to not be the desired format.

Example 4 may include the mobile device of any of the preceding examples wherein the service identification module may include a lookup module to query a remote database using the obtained identifiers.

Example 5 may include the mobile device of any of the preceding examples wherein each of the indicators may further indicate an environment in which an IoT device is deployed and at least one criterion for utilization of an IoT device.

Example 6 may include the mobile device of any of the preceding examples wherein the lookup module may determine whether each obtained identifier is registered with the remote database, and may register ones of the obtained identifiers with the remote database when the ones of the obtained identifiers are determined to not be registered with the remote database.

Example 7 may include the mobile device of any of the preceding examples wherein the lookup module, as part of a registration of one of the obtained identifiers, may extract at least a device type from each of the ones of the obtained identifiers. The lookup module may generate an indicator for each of the plurality of IoT devices corresponding to the ones of the obtained identifiers based at least in part on the extracted device type, wherein the generated indicator indicates a service type based on the extracted device type. The lookup module may transmit, to the remote database, a request to store the generated indicator in association with a new identifier in the desired format, wherein the new identifier in the desired format is generated by an operator of the remote database.

Example 8 may include the mobile device of any of the preceding examples wherein the mobile device includes a non-transitory computer-readable medium, and the service access module may further determine whether the non-transitory computer-readable medium includes an application to be employed to access to the service. The service access module may obtain the application when the non-transitory computer-readable medium is determined to not include the application. The service access module may execute the application when the non-transitory computer-readable medium is determined to include the application such that the mobile device is enabled to access the at least one service.

Example 9 may include the mobile device of any of the preceding examples wherein the notification may include a list of the plurality of services available to the mobile terminal based on each of the obtained indicators, and the service access module may access the service in response to a selection of the service from the list.

Example 10 may include the mobile device of any of the preceding examples wherein the service notification module may filter the list according to at least one user preference set by the mobile device and contextual information associated with the mobile device. The contextual information may include at least one of a position of the mobile device, an orientation of the mobile device, a movement velocity of the mobile device, and a date and time that the list of services is generated.

Example 11 may include the mobile device of any of the preceding examples wherein the service notification module may filter the list based on a distance between a position of the mobile device and a position of each of the plurality of services. The position of each of the plurality of services may be based on a distance between the position of the mobile device and a position of each of the plurality of IoT devices required to provide each service of the plurality of services.

Example 12 may include the mobile device of any of the preceding examples, wherein a privacy policy may indicate at least one of a desired service type and an undesired service type. The desired service type may indicate a service that a user of the mobile device desires to access, and the undesired service type may indicate a service that the user of the mobile device does not desire to access. The service notification module may filter the list according to the privacy policy such that services of the plurality of services having the desired service type are distinguished from services of the plurality of services having the undesired service type.

Example 13 may include at least one non-transitory computer-readable medium including instructions that may cause a mobile device, in response to execution of the instructions by the mobile device, to detect a plurality of IoT devices; obtain an identifier for each of the plurality of IoT devices based on the detection; obtain an indicator for each of the plurality of IoT devices based at least in part on a corresponding one of the obtained identifiers, wherein each indicator indicates a service type of a corresponding one of the plurality of IoT devices; generate a notification that indicates a plurality of services available to the mobile device based on each of the obtained indicators; and enable the mobile device to access a service of the plurality of services, wherein to access includes utilization of a set of the plurality of IoT devices required to provide the service.

Example 14 may include at least one non-transitory computer-readable medium of the preceding example, wherein the instructions may cause the mobile device, in response to execution of the instructions by the mobile device, to scan a region that surrounds the mobile device for a plurality of signals, where each of the plurality of signals may have been broadcast by a corresponding one of the plurality of IoT devices, and obtain the plurality of signals, to detect the plurality of IoT devices; and extract the identifier for each of the plurality of IoT devices from a corresponding one of the plurality of signals, to obtain the identifier.

Example 15 may include at least one non-transitory computer-readable medium of any of the preceding examples, wherein the instructions may cause the mobile device, in response to execution of the instructions by the mobile device, to determine whether a format of each obtained identifier is a desired format; and convert the format of ones of the obtained identifiers into the desired format when the format of the ones of the obtained identifiers are determined to not be the desired format.

Example 16 may include at least one non-transitory computer-readable medium of any of the preceding examples, wherein the instructions may cause the mobile device, in response to execution of the instructions by the mobile device, to query a remote database using the obtained identifiers.

Example 17 may include at least one non-transitory computer-readable medium of any of the preceding examples, wherein each of the indicators may further indicate an environment in which an IoT device is deployed and at least one criterion for utilization of an IoT device.

Example 18 may include at least one non-transitory computer-readable medium of any of the preceding examples, wherein the instructions may cause the mobile device, in response to execution of the instructions by the mobile device, to determine whether each obtained identifier is registered with the remote database; and register ones of the obtained identifiers with the remote database when the ones of the obtained identifiers are determined to not be registered with the remote database.

Example 19 may include at least one non-transitory computer-readable medium of any of the preceding examples, wherein the instructions may cause the mobile device, in response to execution of the instructions by the mobile device, to extract at least a device type from each of the ones of the obtained identifiers; generate an indicator for each of the plurality of IoT devices corresponding to the ones of the obtained identifiers based at least in part on the extracted device type, wherein the generated indicator may indicate a service type based on the extracted device type; and transmit, to the remote database, a request to store the generated indicator in association with a new identifier in the desired format, wherein the new identifier in the desired format may be generated by an operator of the remote database.

Example 20 may include at least one non-transitory computer-readable medium of any of the preceding examples, wherein the instructions may cause the mobile device, in response to execution of the instructions by the mobile device, to determine whether a non-transitory computer-readable medium associated with the mobile device includes an application to be employed to access to the service; obtain the application when the non-transitory computer-readable medium associated with the mobile device is determined to not include the application; and execute the application when the non-transitory computer-readable medium associated with the mobile device is determined to include the application such that the mobile device is enabled to access the at least one service.

Example 21 may include at least one non-transitory computer-readable medium of any of the preceding examples, wherein the notification may include a list of the plurality of services available to the mobile terminal based on each of the obtained indicators, and wherein the instructions may cause the mobile device, in response to execution of the instructions by the mobile device, to access the service in response to a selection of the service from the list.

Example 22 may include at least one non-transitory computer-readable medium of any of the preceding examples, wherein the instructions may cause the mobile device, in response to execution of the instructions by the mobile device, to filter the list according to at least one user preference set by the mobile device and contextual information associated with the mobile device. The contextual information may include at least one of a position of the mobile device, an orientation of the mobile device, a movement velocity of the mobile device, and a date and time that the list of services is generated.

Example 23 may include at least one non-transitory computer-readable medium of any of the preceding examples, wherein the instructions may cause the mobile device, in response to execution of the instructions by the mobile device, to filter the list based on a distance between a position of the mobile device and a position of each of the plurality of services. The position of each of the plurality of services may be based on a distance between the position of the mobile device and a position of each of the plurality of IoT devices required to provide each service of the plurality of services.

Example 24 may include at least one non-transitory computer-readable medium of any of the preceding examples, wherein a privacy policy may indicate at least one of a desired service type and an undesired service type. The desired service type may indicate a service that a user of the mobile device desires to access, and the undesired service type may indicate a service that the user of the mobile device does not desire to access. The instructions may cause the mobile device, in response to execution of the instructions by the mobile device, to filter the list according to the privacy policy such that services of the plurality of services having the desired service type are distinguished from services of the plurality of services having the undesired service type.

Example 25 may include a computer-implemented method for enabling a mobile device to access a service provided by at least one Internet of Things (IoT) device of a plurality of IoT devices. The method may comprise: detecting, by the mobile device, the plurality of IoT devices; obtaining, by the mobile device, an identifier for each of the plurality of IoT devices based on the detection; obtaining, by the mobile device, an indicator for each of the plurality of IoT devices based at least in part on a corresponding one of the obtained identifiers, wherein each indicator indicates a service type of a corresponding one of the plurality of IoT devices; generating, by the mobile device, a notification that indicates a plurality of services available to the mobile device based on each of the obtained indicators; and enabling, by the mobile device, the mobile device to access a service of the plurality of services, wherein to access includes utilization of a set of the plurality of IoT devices required to provide the service.

Example 26 may include the method of the preceding example, wherein the detecting may comprise scanning a region that surrounds the mobile device for a plurality of signals, where each of the plurality of signals may have been broadcast by a corresponding one of the plurality of IoT devices; obtaining the plurality of signals; and extracting the identifier for each of the plurality of IoT devices from a corresponding one of the plurality of signals to obtain the identifier.

Example 27 may include the method of any of the preceding examples, wherein the obtaining the identifier for each of the plurality of IoT devices may comprise determining whether a format of each obtained identifier is a desired format; and converting the format of ones of the obtained identifiers into the desired format when the format of the ones of the obtained identifiers are determined to not be the desired format.

Example 28 may include the method of any of the preceding examples, wherein the obtaining the indicator for each of the plurality of IoT devices may comprises querying a remote database using the obtained identifiers.

Example 29 may include the method of any of the preceding examples, wherein each of the indicators may further indicate an environment in which an IoT device is deployed and at least one criterion for utilization of an IoT device.

Example 30 may include the method of any of the preceding examples, wherein the method may further comprise determining whether each obtained identifier is registered with the remote database; and registering ones of the obtained identifiers with the remote database when the ones of the obtained identifiers are determined to not be registered with the remote database.

Example 31 may include the method of any of the preceding examples, wherein the registering may comprise extracting at least a device type from each of the ones of the obtained identifiers; generating an indicator for each of the plurality of IoT devices corresponding to the ones of the obtained identifiers based at least in part on the extracted device type, wherein the generated indicator may indicate a service type based on the extracted device type; and transmitting, to the remote database, a request to store the generated indicator in association with a new identifier in the desired format, wherein the new identifier in the desired format may be generated by an operator of the remote database.

Example 32 may include the method of any of the preceding examples, wherein the enabling may comprise determining whether a non-transitory computer-readable medium associated with the mobile device includes an application to be employed to access to the service; obtaining the application when the non-transitory computer-readable medium associated with the mobile device is determined to not include the application; and executing the application when the non-transitory computer-readable medium associated with the mobile device is determined to include the application such that the mobile device is enabled to access the at least one service.

Example 33 may include the method of any of the preceding examples, wherein the notification may include a list of the plurality of services available to the mobile terminal based on each of the obtained indicators, and wherein the enabling may comprise accessing the service in response to a selection of the service from the list.

Example 34 may include the method of any of the preceding examples, wherein the notifying may comprise filtering the list according to at least one user preference set by the mobile device and contextual information associated with the mobile device, wherein the contextual information may include at least one of a position of the mobile device, an orientation of the mobile device, a movement velocity of the mobile device, and a date and time that the list of services is generated.

Example 35 may include the method of any of the preceding examples, wherein the notifying may comprise filtering the list based on a distance between a position of the mobile device and a position of each of the plurality of services. The position of each of the plurality of services may be based on a distance between the position of the mobile device and a position of each of the plurality of IoT devices required to provide each service of the plurality of services.

Example 36 may include the method of any of the preceding examples, wherein a privacy policy may indicate at least one of a desired service type and an undesired service type. The desired service type may indicate a service that a user of the mobile device desires to access, and the undesired service type may indicate a service that the user of the mobile device does not desire to access. The notifying may comprise filtering the list according to the privacy policy such that services of the plurality of services having the desired service type are distinguished from services of the plurality of services having the undesired service type.

Example 37 may include a mobile device comprising: means for detecting the plurality of Internet of Things (IoT) devices; means for obtaining an identifier for each of the plurality of IoT devices based on the detection; means for obtaining an indicator for each of the plurality of IoT devices based at least in part on a corresponding one of the obtained identifiers, wherein each indicator indicates a service type of a corresponding one of the plurality of IoT devices; means for generating a notification that indicates a plurality of services available to the mobile device based on each of the obtained indicators; and means for enabling the mobile device to access a service of the plurality of services, wherein to access includes utilization of a set of the plurality of IoT devices required to provide the service.

Example 38 may include the mobile device of the preceding example, wherein the means for detecting may scan a region that surrounds the mobile device for a plurality of signals, where each of the plurality of signals may have been broadcasted by a corresponding one of the plurality of IoT devices, and to obtain the plurality of signals, to detect the plurality of IoT devices; and the means for obtaining the identifier for each of the plurality of IoT devices may extract the identifier for each of the plurality of IoT devices from a corresponding one of the plurality of signals.

Example 39 may include the mobile device of any of the preceding examples, wherein the means for obtaining the identifier for each of the plurality of IoT devices may comprise means for determining whether a format of each obtained identifier is a desired format, and convert the format of ones of the obtained identifiers into the desired format when the format of the ones of the obtained identifiers are determined to not be the desired format.

Example 40 may include the mobile device of any of the preceding examples, wherein the service identification module may include means for querying a remote database using the obtained identifiers.

Example 41 may include the mobile device of any of the preceding examples, wherein each of the indicators may further indicate an environment in which an IoT device is deployed and at least one criterion for utilization of an IoT device.

Example 42 may include the mobile device of any of the preceding examples, wherein the means for querying the remote database may determine whether each obtained identifier is registered with the remote database; and register ones of the obtained identifiers with the remote database when the ones of the obtained identifiers are determined to not be registered with the remote database.

Example 43 may include the mobile device of any of the preceding examples, wherein the means for querying the remote database, as part of a registration of one of the obtained identifiers, may extract at least a device type from each of the ones of the obtained identifiers; generate an indicator for each of the plurality of IoT devices corresponding to the ones of the obtained identifiers based at least in part on the extracted device type, wherein the generated indicator may indicate a service type based on the extracted device type; and transmit, to the remote database, a request to store the generated indicator in association with a new identifier in the desired format, wherein the new identifier in the desired format may be generated by an operator of the remote database.

Example 44 may include the mobile device of any of the preceding examples, wherein the means for enabling the mobile device to access the service may determine whether the non-transitory computer-readable medium includes an application to be employed to access to the service; obtain the application when the non-transitory computer-readable medium is determined to not include the application; and execute the application when the non-transitory computer-readable medium is determined to include the application such that the mobile device is enabled to access the at least one service.

Example 45 may include the mobile device of any of the preceding examples, wherein the notification may include a list of the plurality of services available to the mobile terminal based on each of the obtained indicators, and the means for enabling the mobile device to access the service may access the service in response to a selection of the service from the list.

Example 46 may include the mobile device of any of the preceding examples, wherein the means for enabling the mobile device to access the service may filter the list according to at least one user preference set by the mobile device and contextual information associated with the mobile device. The contextual information may include at least one of a position of the mobile device, an orientation of the mobile device, a movement velocity of the mobile device, and a date and time that the list of services is generated.

Example 47 may include the mobile device of any of the preceding examples, wherein the means for enabling the mobile device to access the service may filter the list based on a distance between a position of the mobile device and a position of each of the plurality of services. The position of each of the plurality of services may be based on a distance between the position of the mobile device and a position of each of the plurality of IoT devices required to provide each service of the plurality of services.

Example 48 may include the mobile device of any of the preceding examples, wherein a privacy policy may indicate at least one of a desired service type and an undesired service type. The desired service type may indicate a service that a user of the mobile device desires to access, and the undesired service type may indicate a service that the user of the mobile device does not desire to access. The means for enabling the mobile device to access the service may filter the list according to the privacy policy such that services of the plurality of services having the desired service type are distinguished from services of the plurality of services having the undesired service type.

Example 49 may include a system comprising: a plurality of Internet of Things (IoT) devices; an IoT database, which resides on at least one non-transitory computer-readable medium, and stores a plurality of identifiers in association with a corresponding one of a plurality of indicators, wherein each indicator may indicate a service type of a corresponding one of the plurality of IoT devices; an application server including an IoT service module that may enable mobile devices to access at least one service of a plurality of services provided by at least one set of the plurality of IoT devices; and at least one mobile device. The at least one mobile device may include at least one processor; a detection module to operate on the at least one processor to detect a plurality of IoT devices; a service identification module to operate on the at least one processor to obtain an identifier for each of the plurality of IoT devices based on the detection, and obtain, from the IoT database, an indicator for each of the plurality of IoT devices based at least in part on a corresponding one of the obtained identifiers; a service notification module to operate on the at least one processor to generate a notification that indicates the plurality of services available to the mobile device based on each of the obtained indicators; and a service access module to operate on the at least one processor to enable the mobile device to access the service of the plurality of services via the application server, wherein to access includes utilization of the at least one set of the plurality of IoT devices required to provide the service.

Example 50 may include the system of the preceding example, wherein the detection module may scan a region that surrounds the mobile device for a plurality of signals, where each of the plurality of signals may have been broadcast by a corresponding one of the plurality of IoT devices, and to obtain the plurality of signals, to detect the plurality of IoT devices; and the service identification module may extract the identifier for each of the plurality of IoT devices from a corresponding one of the plurality of signals, to obtain the identifier.

Example 51 may include the mobile device of any of the preceding examples, wherein the service identification module may comprise a conversion module to determine whether a format of each obtained identifier is a desired format, and convert the format of ones of the obtained identifiers into the desired format when the format of the ones of the obtained identifiers are determined to not be the desired format.

Example 52 may include the mobile device of any of the preceding examples, wherein the service identification module may include a lookup module to query a remote database using the obtained identifiers.

Example 53 may include the mobile device of any of the preceding examples, wherein each of the indicators may further indicate an environment in which an IoT device is deployed and at least one criterion for utilization of an IoT device.

Example 54 may include the mobile device of any of the preceding examples, wherein the lookup module may determine whether each obtained identifier is registered with the remote database; and register ones of the obtained identifiers with the remote database when the ones of the obtained identifiers are determined to not be registered with the remote database.

Example 55 may include the mobile device of any of the preceding examples, wherein the lookup module, as part of a registration of one of the obtained identifiers, may extract at least a device type from each of the ones of the obtained identifiers; generate an indicator for each of the plurality of IoT devices corresponding to the ones of the obtained identifiers based at least in part on the extracted device type, wherein the generated indicator indicates a service type based on the extracted device type; and transmit, to the remote database, a request to store the generated indicator in association with a new identifier in the desired format, wherein the new identifier in the desired format may be generated by an operator of the remote database.

Example 56 may include the mobile device of any of the preceding examples, wherein the mobile device includes a non-transitory computer-readable medium, and the service access module may further determine whether the non-transitory computer-readable medium includes an application to be employed to access to the service; obtain the application when the non-transitory computer-readable medium is determined to not include the application; and execute the application when the non-transitory computer-readable medium is determined to include the application such that the mobile device is enabled to access the at least one service.

Example 57 may include the mobile device of any of the preceding examples, wherein the notification may include a list of the plurality of services available to the mobile terminal based on each of the obtained indicators, and the service access module may access the service in response to a selection of the service from the list.

Example 58 may include the mobile device of any of the preceding examples, wherein the service notification module may filter the list according to at least one user preference set by the mobile device and contextual information associated with the mobile device. The contextual information may include at least one of a position of the mobile device, an orientation of the mobile device, a movement velocity of the mobile device, and a date and time that the list of services is generated.

Example 59 may include the mobile device of any of the preceding examples, wherein the service notification module may filter the list based on a distance between a position of the mobile device and a position of each of the plurality of services. The position of each of the plurality of services may be based on a distance between the position of the mobile device and a position of each of the plurality of IoT devices required to provide each service of the plurality of services.

Example 60 may include the mobile device of any of the preceding examples, wherein a privacy policy may indicate at least one of a desired service type and an undesired service type. The desired service type may indicate a service that a user of the mobile device desires to access, and the undesired service type may indicate a service that the user of the mobile device does not desire to access. The service notification module may filter the list according to the privacy policy such that services of the plurality of services having the desired service type are distinguished from services of the plurality of services having the undesired service type.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

The invention claimed is:

1. A method comprising:
   identifying, by executing an instruction with processor circuitry, accessible Internet of Things (IOT) devices;

identifying, by executing an instruction with the processor circuitry, operations of respective ones of the IoT devices;
identifying, by executing an instruction with the processor circuitry, at least one of the IoT devices corresponding to a compromised privacy characteristic;
generating, by executing an instruction with the processor circuitry, a notification including a list of graphical control elements corresponding to respective ones of the operations, the graphical control elements to enable selection of the respective ones of the operations, the selection of a first one of the graphical control elements to enable monitoring of data associated with an event;
outputting, by executing an instruction with the processor circuitry, a type and a description associated with the respective ones of the operations;
and
accessing, by executing an instruction with the processor circuitry, the data corresponding to first ones of the IOT devices.

2. The method of claim 1, further including identifying, by executing an instruction with the processor circuitry, the operations in response to a query of an Object Naming Service (ONS), the processor circuitry to perform the query based on identifiers corresponding to the respective ones of the IOT devices.

3. The method of claim 1, further including:
identifying, by executing an instruction with the processor circuitry, a format of the data corresponding to the first ones of the IoT devices; and
in response to determining that the format does not correspond to a desired format, retrieving instructions to convert the data to the desired format.

4. The method of claim 1, further including identifying, by executing an instruction with the processor circuitry, the accessible IOT devices by detecting the IoT devices corresponding to a geographic region.

5. The method of claim 1, further including identifying, by executing an instruction with the processor circuitry, the accessible IoT devices by identifying ones of the IoT devices that are accessible to an entity.

6. The method of claim 5, wherein the entity includes a mobile device.

7. The method of claim 1, further including initiating, by executing an instruction with the processor circuitry, one of the operations based on a message.

8. The method of claim 1, further including updating, by executing an instruction with the processor circuitry, a state of the first ones of the IoT devices by adjusting a position of the first ones of the IoT devices.

9. The method of claim 1, further including identifying, by executing an instruction with the processor circuitry, at least one property associated with the respective ones of the IoT devices, the at least one property including at least one of a device type, an access right, or a location.

10. The method of claim 9, further including targeting, by executing an instruction with the processor circuitry, a group of the IoT devices based on the at least one property.

11. An apparatus comprising:
memory;
machine readable instructions; and
processor circuitry to execute the machine readable instructions to:
identify accessible Internet of Things (IOT) devices;
identify operations of respective ones of the IoT devices;
identify at least one of the IoT devices corresponding to a compromised privacy characteristic;
generate a notification including a list of graphical control elements corresponding to respective ones of the operations, the graphical control elements to enable selection of the respective ones of the operations, the selection of a first one of the graphical control elements to enable monitoring of data associated with an event;
output a type and a description associated with the respective ones of the operations;
and
access the data corresponding to first ones of the IoT devices.

12. The apparatus of claim 11, wherein the processor circuitry is to identify the operations in response to a query of an Object Naming Service (ONS), the processor circuitry to perform the query based on identifiers corresponding to the respective ones of the IoT devices.

13. The apparatus of claim 11, wherein the processor circuitry is to:
identify a format of the data corresponding to the first ones of the IoT devices; and
in response to determining that the format does not correspond to a desired format, retrieve instructions to convert the data to the desired format.

14. The apparatus of claim 11, wherein the processor circuitry is to identify the accessible IoT devices by detecting the IoT devices corresponding to a geographic region.

15. The apparatus of claim 11, wherein the processor circuitry is to identify the accessible IOT devices by identifying ones of the IoT devices that are accessible to an entity.

16. The apparatus of claim 15, wherein the entity includes a mobile device.

17. The apparatus of claim 11, wherein the processor circuitry is to initiate one of the operations based on a message.

18. The apparatus of claim 11, wherein the processor circuitry is to update a state of the first ones of the IoT devices by adjusting a position of the first ones of the IoT devices.

19. The apparatus of claim 11, wherein the processor circuitry is to identify at least one property associated with the respective ones of the IoT devices, the at least one property including at least one of a device type, an access right, or a location.

20. The apparatus of claim 19, wherein the processor circuitry is to target a group of the IoT devices based on the at least one property.

21. The apparatus of claim 19, wherein the processor circuitry is to identify a change in the at least one property.

22. A non-transitory computer readable medium comprising instructions to cause processor circuitry to at least:
identify accessible Internet of Things (IOT) devices;
identify operations of respective ones of the IoT devices;
identify at least one of the IoT devices corresponding to a compromised privacy characteristic;
generate a notification including a list of graphical control elements corresponding to respective ones of the operations, the graphical control elements to enable selection of the respective ones of the operations, the selection of a first one of the graphical control elements to enable monitoring of data associated with an event;
output a type and a description associated with the respective ones of the operations;
and access the data corresponding to first ones of the IoT devices.

23. The non-transitory computer readable medium of claim 22, wherein the instructions cause the processor circuitry to identify the operations in response to a query of an Object Naming Service (ONS), the processor circuitry to perform the query based on identifiers corresponding to the respective ones of the IOT devices.

24. The non-transitory computer readable medium of claim 22, wherein the instructions cause the processor circuitry to:
identify a format of the data corresponding to the first ones of the IoT devices; and
in response to determining that the format does not correspond to a desired format, retrieve instructions to convert the data to the desired format.

25. The non-transitory computer readable medium of claim 22, wherein the instructions cause the processor circuitry to identify the accessible IoT devices by detecting the IoT devices corresponding to a geographic region.

26. The non-transitory computer readable medium of claim 22, wherein the instructions cause the processor circuitry to identify the accessible IoT devices by identifying ones of the IoT devices that are accessible to an entity.

27. The non-transitory computer readable medium of claim 26, wherein the entity includes a mobile device.

28. The non-transitory computer readable medium of claim 22, wherein the instructions cause the processor circuitry to initiate one of the operations based on a message.

29. The non-transitory computer readable medium of claim 22, wherein the instructions cause the processor circuitry to update a state of the first ones of the IoT devices by adjusting a position of the first ones of the IoT devices.

30. The non-transitory computer readable medium of claim 22, wherein the instructions cause the processor circuitry to identify at least one property associated with the respective ones of the IoT devices, the at least one property including at least one of a device type, an access right, or a location.

31. The non-transitory computer readable medium of claim 30, wherein the instructions cause the processor circuitry to target a group of the IOT devices based on the at least one property.

32. The non-transitory computer readable medium of claim 30, wherein the instructions cause the processor circuitry to identify a change in the at least one property.

* * * * *